(12) United States Patent
Liu

(10) Patent No.: US 9,841,893 B2
(45) Date of Patent: Dec. 12, 2017

(54) DETECTION OF A JOLT DURING CHARACTER ENTRY

(75) Inventor: Yingfei Liu, Beijing (CN)

(73) Assignee: Nokia Technologies Oy, Espoo (FI)

(*) Notice: Subject to any disclaimer, the term of this patent is extended or adjusted under 35 U.S.C. 154(b) by 94 days.

(21) Appl. No.: 14/388,420

(22) PCT Filed: Mar. 30, 2012

(86) PCT No.: PCT/CN2012/073341
§ 371 (c)(1),
(2), (4) Date: Sep. 26, 2014

(87) PCT Pub. No.: WO2013/143131
PCT Pub. Date: Oct. 3, 2014

(65) Prior Publication Data
US 2015/0067488 A1    Mar. 5, 2015

(51) Int. Cl.
*G06F 17/00* (2006.01)
*G06F 3/0488* (2013.01)
(Continued)

(52) U.S. Cl.
CPC ........ *G06F 3/04883* (2013.01); *G06F 1/1694* (2013.01); *G06F 3/016* (2013.01);
(Continued)

(58) Field of Classification Search
CPC .................................................. G06F 3/04883
See application file for complete search history.

(56) References Cited

U.S. PATENT DOCUMENTS

| 5,414,228 A | 5/1995 | Yamashita |
| 5,500,937 A | 3/1996 | Thompson-Rohrlich |

(Continued)

FOREIGN PATENT DOCUMENTS

| CN | 101178633 A | 5/2008 |
| CN | 101799740 | 8/2010 |

(Continued)

OTHER PUBLICATIONS

Reid et al., "A Collaborative Multimodal Handwriting Training Environment for Visually Impaired Students," Proceedings of OZCHI 2008, Dec. 2008, Austrialia, p. 195-202.*

(Continued)

*Primary Examiner* — Amelia Tapp
(74) *Attorney, Agent, or Firm* — Alston & Bird LLP

(57) ABSTRACT

An apparatus comprising at least one processor; and at least one memory including computer program code, the at least one memory and the computer program code configured to, with the at least one processor, cause the apparatus to perform at least the following: enable detection of one or more stroke user inputs for use in deciphering an entered character during a character entry mode; enable detection of a jolt during the character entry mode; upon detection of the jolt, associate one or more of the stroke user inputs with the jolt; and provide for a predetermined timeout period during which the one or more associated stroke user inputs are at least one of considered for removal from display and considered for removal from consideration in deciphering the entered character.

20 Claims, 6 Drawing Sheets

(51) Int. Cl.
  *G06F 1/16* (2006.01)
  *G06F 3/01* (2006.01)
  *G06F 17/24* (2006.01)

(52) U.S. Cl.
  CPC ...... *G06F 17/24* (2013.01); *G06F 2200/1637* (2013.01); *G06F 2203/014* (2013.01)

(56) References Cited

U.S. PATENT DOCUMENTS

| | | | |
|---|---|---|---|
| 5,903,667 A * | 5/1999 | Kuzunuki | G06F 3/04883 382/187 |
| 8,531,414 B2 * | 9/2013 | Huibers | G06F 3/0418 257/428 |
| 9,021,279 B2 * | 4/2015 | Gunther | G06F 1/3203 713/300 |
| 2011/0187652 A1 | 8/2011 | Huibers | |
| 2012/0216113 A1 * | 8/2012 | Li | G06K 9/00416 715/702 |
| 2014/0171153 A1 * | 6/2014 | Kienzle | G06F 3/0237 455/566 |

FOREIGN PATENT DOCUMENTS

| | | |
|---|---|---|
| CN | 102077153 | 5/2011 |
| CN | 102112948 A | 6/2011 |
| CN | 102239069 A | 11/2011 |

OTHER PUBLICATIONS

International Search Report and Written Opinion from International Application No. PCT/CN2012/073341, dated Jan. 10, 2013.
Office Action for corresponding Chinese Application No. 201280073574.0 dated Oct. 9, 2016.

\* cited by examiner

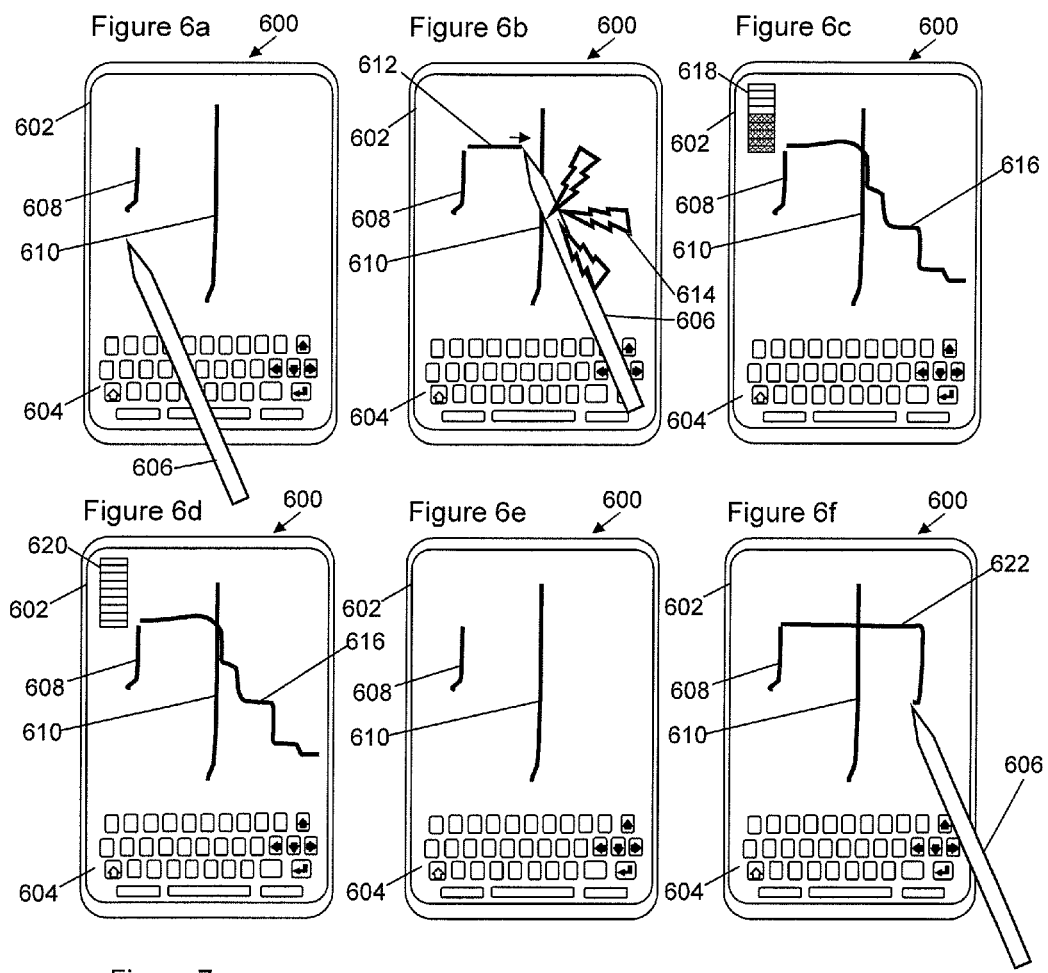
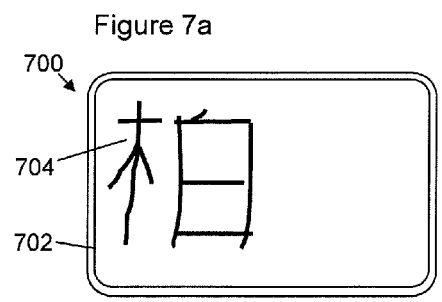
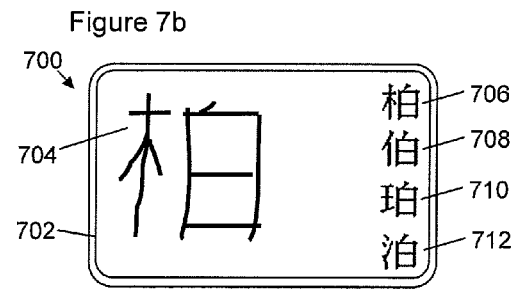

DETECTION OF A JOLT DURING CHARACTER ENTRY

TECHNICAL FIELD

The present disclosure relates to the field of user interfaces, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs) and tablet personal computers.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Some portable electronic devices are configured to allow a user to enter characters and text by scribing on a suitable surface, such as a touch-sensitive screen. In this way the user can input characters to the device in a similar manner to writing with a pen on paper. The device may be configured to compare the entered character with entries in a database of characters so that the user can select, from the database, the character which they wished to enter. Entry of a bad stroke during entry of a character may mean that the device cannot find a match in the database of characters. The user may have to enter the whole character again to try and obtain a match.

The listing or discussion of a prior-published document or any background in this specification should not necessarily be taken as an acknowledgement that the document or background is part of the state of the art or is common general knowledge.

SUMMARY

In a first aspect, there is provided an apparatus, the apparatus comprising:
at least one processor; and
at least one memory including computer program code,
the at least one memory and the computer program code configured to, with the at least one processor, cause the apparatus to perform at least the following:
enable detection of one or more stroke user inputs for use in deciphering an entered character during a character entry mode;
enable detection of a jolt during the character entry mode;
upon detection of the jolt, associate one or more of the stroke user inputs with the jolt; and
provide for a predetermined timeout period during which the one or more associated stroke user inputs are at least one of
considered for removal from display and
considered for removal from consideration in deciphering the entered character.

A stroke user input may be a line, curve, dot or flick forming a stroke which forms part (or all of) a character, letter, number or symbol. For example, the western letter "x" may be written with two stroke user inputs, once from top left to bottom right, and a second stroke from top right to bottom left, crossing the first stroke at the centre of the two strokes.

Deciphering an entered character may be comparing the user-entered character with a list of predefined characters stored, for example, in a database accessible by the apparatus (the database may or may not be stored on the apparatus, e.g. the database may be on a remote server). Deciphering may be taken to mean understanding the entered strokes forming a character with a view to providing a predefined matching character. A jolt is a sudden, abrupt and/or uncharacteristic movement of the apparatus, user and/or scribing/writing implement. A jolt may occur by the user's writing hand or arm being pushed or knocked, or by the user holding and using the apparatus while travelling in a vehicle which, for example, moves over a speed bump or stops abruptly. A predetermined timeout period may be considered a period of time (for example, 1, 2 or 3 seconds) during which the apparatus is configured to consider a stroke/strokes entered upon detection of (e.g. during) a jolt for removal from display and/or removal from consideration in deciphering the entered character.

The apparatus may be configured to enable detection of one or more further stroke user inputs during the predetermined timeout period to allow input of a character to be completed, and if one or more further stroke user inputs are detected during the predetermined timeout period, the one or more associated stroke user inputs are at least one of displayed and considered in deciphering the entered character. During the timeout period, the user may be able to continue entering stroke user inputs to complete the character they are inputting. The user may be happy with the input entered during the detected jolt, for example if the jolt did not affect the way in which the user wished to enter the associated stroke user input. The associated stroke user inputs may still be displayed and/or be considered in deciphering the entered character.

The apparatus may be configured to enable detection of one or more further stroke user inputs during the predetermined timeout period to allow input of a character to be completed, and if one or more further stroke user inputs are detected during the predetermined timeout period, the one or more associated stroke user inputs are at least one of removed from display and removed from consideration in deciphering the entered character. In this case the associated stroke user inputs are at least one of removed from display and removed from consideration in deciphering the entered character.

The apparatus may be configured to remove the one or more associated stroke user inputs from display but still consider the one or more associated stroke user inputs in deciphering the entered character according to a predetermined criterion. That is, in the event of an associated stroke user input being made (during/upon detection of a jolt), the stroke may be removed from display, for example to allow the user to continue entering the character without being distracted by an incorrect (associated) stroke user input. The stroke may still be considered in deciphering the entered character.

The predetermined criterion for still considering the one or more associated stroke user inputs in deciphering the entered character may include determining if one or more further stroke user inputs entered during the predetermined timeout period have been entered partially or wholly in the same region as the associated stroke user input (for example, by a user re-scribing the stroke correctly/without a jolt). The consideration may include determining that the associated stroke user inputs still contribute to an entered character which can be reasonably deciphered despite being entered during a jolt. If one or more of these consideration is determined (for example, the associated stroke user inputs can be used to decipher the entered character, or the associated stroke user inputs have been entered at least partially in the same region as one or more further stroke user inputs), then the one or more associated stroke user inputs may be considered in deciphering the entered character. It will be appreciated that these example demonstrate associated stroke user inputs which are still useful, despite being made during detection of a jolt, in deciphering the entered character. A determination is made according to one or more predetermined ("useful") criteria, examples of which are given.

The apparatus may be configured to remove from consideration the one or more associated stroke user inputs in deciphering the entered character according to a predetermined criterion which may include determining that the one or more associated stroke user inputs touch the edge of a predefined stroke user input region (for example, if the user is jolted and moves the scribing stylus off one edge of the user input region, or off one edge of a touch-sensitive screen). Another example is determining that the one or more associated stroke user inputs include more than a predetermined number of direction changes. It may be imagined that if jolted, a user may enter a scribble/jagged stroke instead of a smooth stroke as intended. Another example is determining that the one or more associated stroke user inputs cross one or more previously entered stroke user inputs more than a predetermined number of times. Again, during a detected jolt (for example if the user is travelling in a car which moves over a bumpy road) the user may accidentally cross over previously entered stroke user inputs with an erroneous stroke. Another example is determining that the one or more associated stroke user inputs provide a change in applied pressure exceeding a predetermined pressure range during character entry. The scribing surface (e.g. touch sensitive screen) may be able to detect changes in applied pressure, and in the event of the user entering a stroke user input during a jolt, it may be imagined that the user may apply uneven/unexpectedly varying pressure during the associated stroke user input(s).

If one or more of these considerations is determined (e.g. according to a predetermined criterion mentioned above), then the one or more associated stroke user inputs may be removed from consideration in deciphering the entered character. It will be appreciated that these examples demonstrate associated stroke user inputs which may not be useful in deciphering the entered character due to made during detection of a jolt. and which are determined according to one or more predetermined criteria (i.e. "non-useful" criteria).

The apparatus may be configured to enable detection of one or more further stroke user inputs only after the predetermined timeout period to allow input of a character to be completed, with the one or more associated stroke user inputs. That is, only after the timeout period has ended (and thus not during the predetermined timeout period), the user may be able to continue entering stroke user inputs to complete their entered character. If one or more further stroke user inputs are detected after the predetermined timeout period, the one or more associated stroke user inputs may be at least one of displayed and considered in deciphering the entered character.

The apparatus may be configured to enable detection of one or more further stroke user inputs only after the predetermined timeout period to allow input of a character to be completed. If one or more further stroke user inputs are detected after the predetermined timeout period, the one or more associated stroke user inputs may be at least one of removed from display and removed from consideration in deciphering the entered character.

The apparatus may be configured such that no further stroke user inputs are detected during the predetermined timeout period for use in deciphering the entered character. Thus, it may be that the user is not allowed to make further stroke user inputs during the timeout period. The user may, for example, attempt to make further stroke user inputs during the timeout period but they may not appear on the display, or they may appear greyed out, or the apparatus may provide an alert such as a visual, audio or tactile alert to inform the user that their further stroke user inputs are not being received during the timeout period.

The apparatus may be configured to indicate to the user the one or more associated stroke user inputs, to allow the user to at least one of remove from display and remove from consideration in deciphering the entered character, the one or more associated stroke user inputs.

The indication may be presented by the associated stroke user inputs being indicated differently to the other stroke user inputs on the stroke input region of the screen. For example, associated stroke user inputs may be greyed-out, appear in a different colour (e.g. red), flash, appear as dotted lines, or appear otherwise differently to other stroke user inputs to indicate that the associated stroke user inputs have been detected during a jolt. In other examples, the indications may not appear directly on the character being entered in the stroke input region of the screen, but may appear in a character indicator, for example in a corner of the display. The indication may comprise displaying the associated stroke user inputs in a different way in the character indicator to other stroke user inputs. In other examples the indication may comprise an audio alert (beep, buzz, tone) and/or a haptic alert (vibration) to indicate that an associated stroke user input has been detected.

The apparatus may be configured to present an option for selection by the user during the predetermined timeout period, the selection of the option allowing the user one or more of removal from display and removal from consideration in deciphering the entered character, of the one or more associated stroke user inputs.

The option may be presented as a pop-up button or area containing one or more selectable options. The user may be able to manually select, during the timeout period, to remove the associated stroke user input from display, remove the associated stroke user input from consideration in deciphering the entered character, or both. Continuation of character entry during or after the predetermined timeout period may remove the pop-up button or area to, for example, still display/consider the associated stroke user inputs in deciphering the entered character.

The apparatus may be configured such that upon completion of character entry, the apparatus provides one or more predefined deciphered characters for selection, the predefined deciphered characters determined by the apparatus to match the entered character. The apparatus may determine (by itself, or in conjunction with other apparatus) that a character entry has been completed by, for example, detecting that no stroke user input has been made during a predetermined time period. For example, if the user does not make any stroke user inputs for three seconds, the apparatus may be configured to detect the three second pause as an indication that the character has been completed. Alternatively the user may be able to actively make an input to indicate that the character entry has been completed such as, for example, tapping a particular area of the display (which may display a button labelled "done" or similar), or performing a particular user input which the apparatus is configured to recognise as indicating that the character entry is complete.

The one or more predefined deciphered characters may be in a list or database of characters available to the apparatus. In the case where the character is, for example, an English word, the predefined deciphered characters may be a list of English words from, for example, an electronic dictionary.

The entered character may comprise a series of two or more sub-characters, which may or may not be joined (such as in the case of joined-up handwriting). That is, an English word may be considered to be a character, and each letter in the word may be considered to be a sub-character (these letters may be joined together). If they are joined, they may or may not be considered a joined character representing a word. A Chinese word, for example "Shanghai", may be considered a character comprising a series of two sub-characters, "shang" and "hai". A character may also be one Chinese character, for example the Chinese character for "East", which in this case only comprises one graphic character.

The apparatus may be configured to decipher at least one of, a letter character, a textual character, a number, a graphic character, an emoticon, a glyph, and a punctuation mark. Letter characters may upper case letter characters and lower case letter characters, from the Roman, Greek, Arabic or Cyrillic alphabets, for example. A textual character may be a combination of letter characters together forming a word or item of text. A graphic character may be a sinograph, a Japanese kana or a Korean character. An emoticon may be, for example, a smiley face (☺). A glyph may be an element of writing such as a letter, an accent or embellishment associated with a letter, a symbol, or any other pictorial representation of an element of writing. A letter character may include an accent or embellishment mark (such as found in, for example, the Turkish, French, and Polish languages. The 'tail' of the '@' symbol may be considered an embellishment mark associated with an 'a' character. The circle around the 'c' character in the copyright symbol '©' may be an embellishment mark (similarly for the ® registered trademark symbol). Some currency symbols may be considered to be embellished letter characters e.g. cent '¢', dollar '$', yen '¥', euro '€'. A punctuation mark may be, for example, a comma (,), full stop/period (.), semicolon (;), colon (:), brackets (( ), [ ], { }), or other symbol (such as the percentage symbol %, hash symbol #, and mathematical signs).

The apparatus may be configured to enable detection of one or more stroke user inputs entered by a user on a touch-sensitive display. A touch-sensitive display may be considered a touch-screen (of, for example, a smart phone or tablet/desktop/laptop computer), or a graphics tablet. Other methods of entering stroke user inputs include using a peripheral mouse, joystick, wand or trackball to scribe stroke user inputs detected by an apparatus and displayed on a monitor/display of the apparatus/electronic device.

The apparatus may be configured to enable detection of the jolt via one or more of an accelerometer of the apparatus and an accelerometer located with a stylus for entering stroke user inputs to the apparatus. In the case of an accelerometer being located with the apparatus, if the apparatus is jolted then a jolt may be detected by the accelerometer in the apparatus. In the case where the accelerometer is located with the stylus, then even if the apparatus is not jolted, but the user's writing hand is jolted, which may lead to the input of an erroneous or incorrect stroke user input, the jolt of the user's hand may be detected by the stylus accelerometer. Accelerometers may be located both in the apparatus and in the stylus. The apparatus could be located in the stylus only.

The apparatus may be configured to recognise characteristics of the user's handwriting by eliminating associated stroke user inputs from consideration in deciphering the entered character. The apparatus may be configured with a "self-learning" application which considers the previous characters entered by a user, and uses the previous inputs of the user in improving the accuracy of deciphering characters entered in the future (e.g. by updating the character database). The apparatus may eliminate associated stroke user inputs from consideration in deciphering the entered character and thereby may mitigate any reduction in accuracy of deciphering characters due to the entry of an associated stroke user input/malformed character.

The apparatus may be configured to perform one or more of removal from display or removal from consideration in deciphering an entered character of one or more associated stroke user inputs without user confirmation. That is, explicit user confirmation/input may not be required for the apparatus to remove the associated stroke user inputs from display, and/or remove the associated stroke user inputs from consideration in deciphering the entered character.

The apparatus may be a portable electronic device, a mobile phone, a smartphone, a tablet computer, a personal digital assistant, a laptop computer, a graphics tablet, a non-portable electronic device, a desktop computer, or a module/circuitry for one or more of the same.

In another aspect, there is provided a method, the method comprising:
 detecting one or more stroke user inputs for use in deciphering an entered character during a character entry mode;
 detecting a jolt during the character entry mode;
 upon detection of the jolt, associating one or more of the stroke user inputs with the jolt; and
 providing for a predetermined timeout period during which the one or more associated stroke user inputs are at least one of
 considered for removal from display and
 considered for removal from consideration in deciphering the entered character.

In another aspect there is provided a computer readable medium comprising computer program code stored thereon, the computer readable medium and computer program code being configured to, when run on at least one processor, perform at least the following:
 enable detection of one or more stroke user inputs for use in deciphering an entered character during a character entry mode;
 enable detection of a jolt during the character entry mode;
 upon detection of the jolt, associate one or more of the stroke user inputs with the jolt; and
 provide for a predetermined timeout period during which the one or more associated stroke user inputs are at least one of
 considered for removal from display and considered for removal from consideration in deciphering the entered character.

The computer program may be stored on a storage media (e.g. on a CD, a DVD, a memory stick or other non-transitory medium). The computer program may be configured to run on a device or apparatus as an application. An application may be run by a device or apparatus via an operating system.

In another aspect, there is provided an apparatus, the apparatus comprising:
means for enabling detection of one or more stroke user inputs for use in deciphering an entered character during a character entry mode;
means for enabling detection of a jolt during the character entry mode;
upon detection of the jolt, means for associating one or more of the stroke user inputs with the jolt; and
means for providing for a predetermined timeout period during which the one or more associated stroke user inputs are at least one of
considered for removal from display and
considered for removal from consideration in deciphering the entered character.

The present disclosure includes one or more corresponding aspects, embodiments or features in isolation or in various combinations whether or not specifically stated (including claimed) in that combination or in isolation. Corresponding means and corresponding functional units (e.g. character entry detector, jolt detector, jolt associator, predetermined timeout period provider) for performing one or more of the discussed functions are also within the present disclosure.

Corresponding computer programs for implementing one or more of the methods disclosed are also within the present disclosure and encompassed by one or more of the described embodiments.

BRIEF DESCRIPTION OF THE FIGURES

A description is now given, by way of example only, with reference to the accompanying drawings, in which:

FIGS. 6a-6f illustrate an example of a stylus/apparatus being jolted while a user is entering a character with the stylus;

FIGS. 7a-7b illustrate an example of a device/apparatus providing predefined characters determined to match a character entered by a user;

DESCRIPTION OF EXAMPLE ASPECTS/EMBODIMENTS

Figure 1:
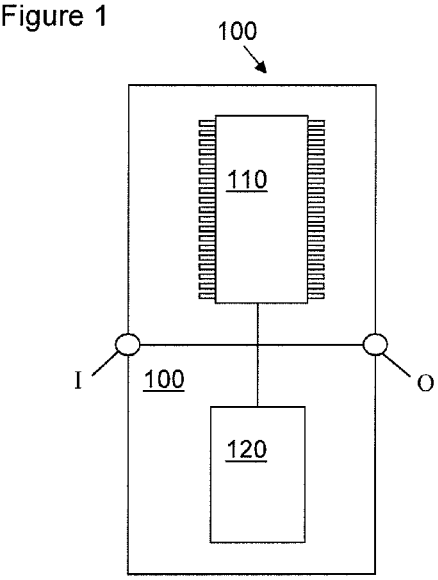
FIG. 1 illustrates an example apparatus according to the present disclosure.

Other embodiments depicted in the figures have been provided with reference numerals that correspond to similar features of earlier described embodiments. For example, feature number 100 can also correspond to numbers 400, 500, 600 etc. These numbered features may appear in the figures but may not have been directly referred to within the description of these particular embodiments. These have still been provided in the figures to aid understanding of the further embodiments, particularly in relation to the features of similar earlier described embodiments.

Some portable electronic devices are configured to allow a user to enter characters and text by scribing on a suitable surface, such as a touch-sensitive screen. In this way the user can input characters to the device in a similar manner to writing with a pen on paper. The device may be configured to compare the entered character with entries in a database of characters so that the use can select, from the database, the character which they wished to enter.

The ability to enter characters by scribing may be of particular interest for users who wish to use an alphabet or writing system for which typing the characters is not so practical. For example, users wishing to enter Chinese or Japanese characters may find inputting characters using scribing an easier and more intuitive method than using a physical keyboard based method. In particular, the use of a physical Chinese keyboard for entering text on a portable electronic device such as a smartphone or PDA may be more difficult than entering alphanumeric English text, for example.

Some characters may be made up of several individual strokes. For example, some Chinese characters may require the entry of up to 30 individual strokes for one character. If the user makes an error inputting one of these strokes (for example, if they or the device are pushed/jolted during the input of a stroke), then the device may not be able to correctly match the entered character with an entry in a database of characters. In this case, the user may have to re-enter the whole character in a further attempt for the device to recognise it and find a correct match for that character in the database. In the case of more complex characters in particular, this may be time consuming and frustrating for the user.

If the user completes the input of all strokes of a particular character, and if due to the entry of one or more bad strokes (for example, if the user was jolted during he entry of a stroke), the device may be unable to find a correct match, or even a match at all. Not only would the user waste time waiting for the device to try and find a match for a badly-written stroke, but the user also would have to spend more time and effort re-entering the character.

FIG. 1 shows an apparatus 100 comprising a processor 110, memory 120, input I and output O. In this embodiment only one processor and one memory are shown but it will be appreciated that other embodiments may utilise more than one processor and/or more than one memory (e.g. same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signalling to the apparatus 100 from further components. The output O allows for onward provision of signalling from the apparatus 100 to further components. In this embodiment the input I and output O are part of a connection bus that allows for connection of the apparatus 100 to further components. The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this embodiment the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other embodiments, one or more or all of the components may be located separately (for example, throughout a portable electronic device such as devices 200, 300, or within a network such as a "cloud" and/or may provide/support other functionality).

Figure 2:
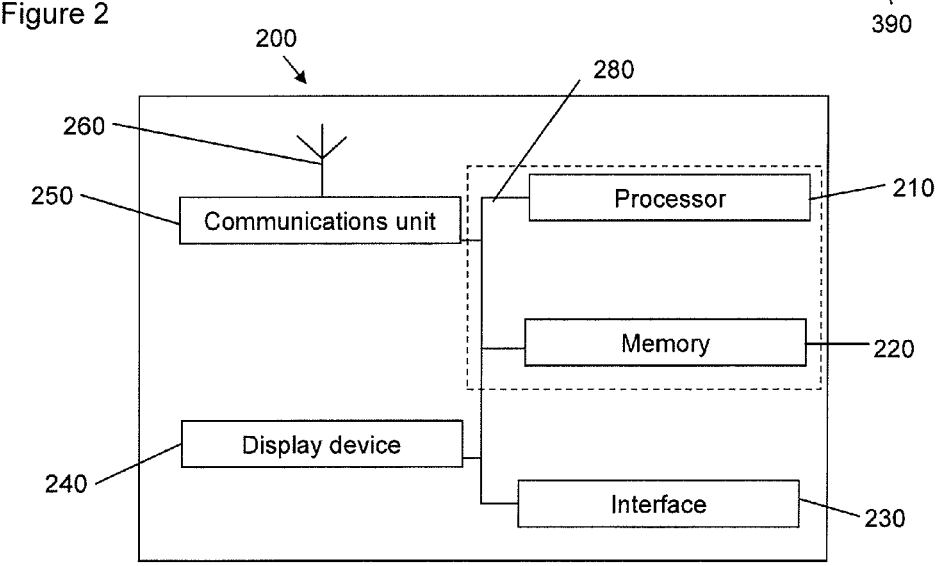
FIG. 2 illustrates another example apparatus according to the present disclosure.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for a mobile phone or PDA or audio/video player or the like. Such a module, apparatus or device may just comprise a suitably configured memory and processor.

The example apparatus/device 200 comprises a display 240 such as, a Liquid Crystal Display (LCD), e-Ink, or touch-screen user interface (like a tablet PC). The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Figure 3:
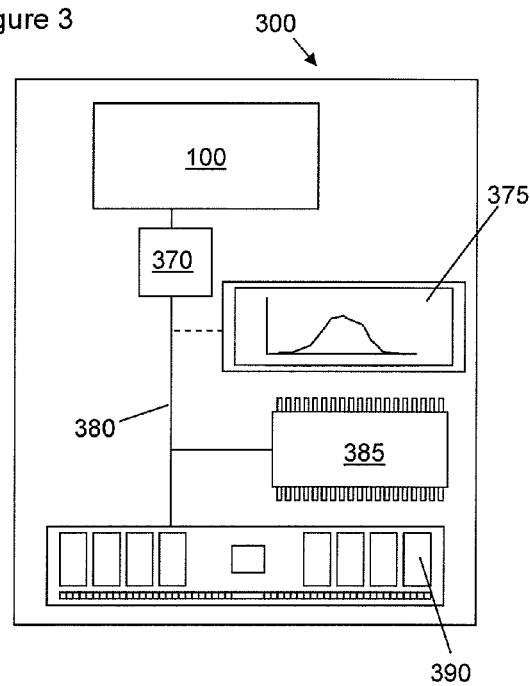
FIG. 3 illustrates a further example apparatus according to the present disclosure.

Device/apparatus 300 shown in FIG. 3 may be an electronic device (including a tablet personal computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 380 to access the computer program code.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

FIGS. 4a-4f illustrate an example embodiment of an apparatus in use. The apparatus is a portable electronic device 400 such as a tablet computer, smartphone, PDA or graphics tablet. The device 400 has a touch-sensitive screen 402 and a western physical keyboard (for example, QWERTY or AZERTY). The device 400 is running an application which allows the user to enter characters into the application by scribing strokes onto the touch-sensitive screen 402. Such an application may be a e-mail or text message editor, a word processor, an internet based website with a text-entry field, a graphical/drawing application, or other application allowing the entry of text and/or characters. In this example, the user is entering a Chinese character.

It will be appreciated that the user may not be restricted to the entry of Chinese characters, and the entry of, for example, characters from the Japanese, Korean, Russian, Thai, Turkish, Arabic, English and many other languages may be entered and deciphered by the apparatus. This may be dependent on the particular application being run on the apparatus; particular applications may be suited to the deciphering of characters and text from one or more particular languages. Further, example applications may also be able to decipher user-entered letter characters, textual characters, numbers, graphic characters, emoticons, glyphs and/or punctuation marks.

Figure 4A:
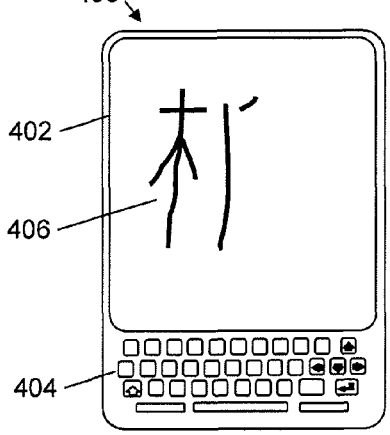
FIGS. 4a-4f illustrate an example of a device/apparatus being jolted while a user is entering a character, where the user waits for a timeout period before continuing the character entry.

The apparatus is operating in a character entry mode; that is, the apparatus/device is running an application which allows a user to enter characters via scribing on the touch-sensitive screen. The user in this example is able to scribe using their finger (or thumb). The user can enter one or more stroke inputs on the touch-sensitive screen 402 to build up the completed character. In FIG. 4a, the user has partially entered the character by inputting six strokes 406.

The apparatus is able to decipher the entered character. This apparatus may perform some deciphering of the character as the strokes are entered, or the apparatus may perform the deciphering upon completion of the entry on a character. The deciphering may be via comparison of the entered strokes with entries in a database of known characters so that, upon completion of the character entry, the user is able to choose a character from a list of characters determined by the apparatus to match the user-entered character.

Figure 4B:
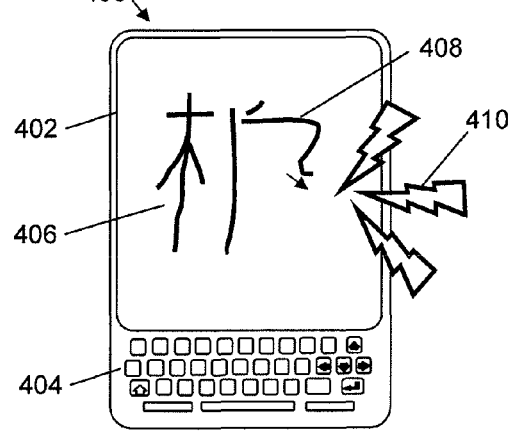

In FIG. 4b, the device 400 has been jolted 410 during the user's seventh stroke input 408. The apparatus is configured to enable detection of the jolt via an accelerometer of the apparatus. In other examples (such as in FIG. 6) where stroke user inputs are entered by a user scribing with a stylus on a screen, an accelerometer located with a stylus may be used to detect a jolt. An example apparatus may include both an accelerometer in the apparatus and another accelerometer with the stylus (or an accelerometer in the stylus only). The detection of the apparatus being jolted may be useful if, for example, the user is operating the apparatus while being a passenger in a bus or car, and the vehicle stops suddenly or drives over a bump in the road. The detection of the stylus being jolted may be useful if the user is sat next to another person in a stationary location (such as on a chair at home) and the other person pushed the user's writing arm. In this case the apparatus/device would not be jolted, but the user's arm and stylus would, and the accelerometer in the stylus may detect the jolt.

If the user writes in a particular way such that particular characteristics of the user's handwriting may be interpreted as erroneous stroke entries, this would be frustrating for the user, as errors would be detected by the device when no error has been made. By associating a stroke user input with a jolt detected via the accelerometer, a user may be able to enter stroke user inputs having particular user characteristics due to the user's handwriting, and the likelihood of considering such user strokes as potentially erroneous is lowered if no associated jolt is detected. This may help to improve the user experience as only stroke user inputs entered and associated with a detected jolt may be flagged as potentially erroneous.

In examples in which the apparatus is configured for handwriting recognition, by identifying particular characteristics of the user's stroke user inputs/handwriting, the device/apparatus may be able to better provide matches for user-entered characters. In such a case, where the device is essentially "learning" the user's handwriting by identifying characteristics of the user's handwriting, the entry of an erroneous stroke may reduce the accuracy with which the device is able to recognise the user's character entries in the future. Therefore the ability to remove such an erroneous stroke from consideration in deciphering the entered character may help prevent any reduced future accuracy of handwriting recognition.

Figure 4C:
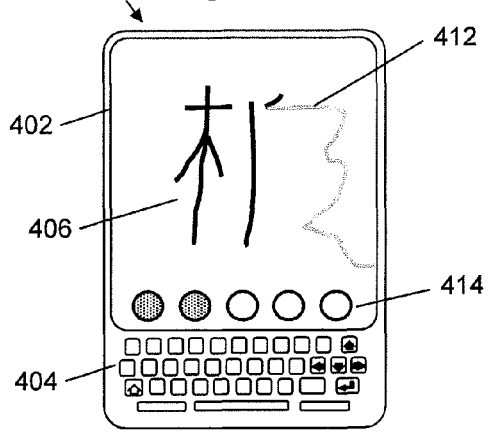

In FIG. 4c, after the complete seventh stroke 412 has been entered and after the jolt 410 has stopped, it can be seen that the completed seventh stroke 412 is not entered correctly. The apparatus detected the jolt 410, and associated the stroke user input being entered 408, 412 at the time of the jolt 410 with the jolt 410. In this way the device can determine that the stroke 412 associated with the jolt may not be correct. The apparatus/device 400 in this example is configured to indicate to the user the one or more associated stroke user inputs 412. In this example the associated stroke user input 412 is shown "greyed-out". In other examples the associated stroke user input may be shown in a different colour to other stroke user inputs, may flash, and/or an audio alert may sound to indicate to the user that an associated stroke user input has been made. The user may, in some examples, then provide further user input, for example by selecting the indicated associated stroke user input, and opt to remove the associated stroke user input from display and/or remove the associated stroke user input from consideration in deciphering the entered character.

In the example of FIGS. 4a-4f, the apparatus is configured such that the user may continue to enter further stroke user inputs, which would be detected by the apparatus, during the predetermined timeout period, although the user has chosen not to do so, but to wait until the end of the timeout period before continuing. In other examples, the apparatus may be configured such that no further stroke user inputs may be detected during the predetermined timeout period. It may be in these examples that the user may attempt to enter further stroke user inputs but that they do not appear on the display, or they appear "greyed out" rather than normally, to indicate that these further user inputs will not be detected (and user for deciphering the entered character). The apparatus may vibrate, buzz, sound a tone, or provide another feedback indication to the user that further user inputs cannot be made, and/or will not be detected (for use in deciphering the entered character) during the timeout period.

The apparatus/device provides for a predetermined timeout period, as shown by the timeout countdown symbols 414 at the bottom of the display 402. The predetermined timeout period may be, for example, five seconds (it may be longer or shorter). The duration of the timeout period may be preset (predetermined) on the apparatus in the factory settings, and/or may be preset (predetermined) by the user in the user settings of the apparatus/device 400. For example, a novice user may wish to have a longer predetermined timeout period of, for example, eight seconds, whereas an experienced user may wish to have a shorter predetermined timeout period, for example of 2 seconds.

During the predetermined timeout period, the associated stroke user input 412 is at least one of considered for removal from display and considered for removal from consideration in deciphering the entered character. In this example, the associated stroke user input 412 remains displayed (and the apparatus does not consider the stroke for removal during the timeout period). That is, the apparatus/device 400 does not remove the associated stroke user input 412 from display during the timeout period (but removes the associated stroke user input 412 after the timeout period has expired; see FIG. 4d).

The apparatus considers the associated stroke user input for removal from consideration in deciphering the whole entered character. In this example, this consideration includes considering three factors, and deciding whether or not to consider the associated stroke user inputs for deciphering the entered character based on the outcomes of the three considered factors.

First the consideration includes determining if the associated stroke user input 412 contributes to an entered character which can be deciphered, by considering if the overall form of the stroke corresponds to a predetermined series of stroke forms used in Chinese characters. In this example, the apparatus determines that the associated stroke user input 412 does not correspond with any of the predetermined stroke forms. The consideration in this example also includes determining if the associated stroke user input 412 touches the edge of a predefined stroke user input region. In this case the apparatus determines that the associated stroke user input 412 does indeed touch the edge of the predefined stroke user input region (in this example, the surface of the touch-sensitive display 402). The consideration in this example also includes determining if the one or more associated stroke user inputs include more than a predetermined number of direction changes. In this case the apparatus determines that the associated stroke user input 412 does indeed have more than the predetermined number of direction changes. This example has a predetermined number of direction changes of 5, and the apparatus has determined that the associated stroke user input has changed direction 7 times.

From the consideration of these three factors, the apparatus therefore does not consider the associated stroke user input 412 in deciphering the entered character. In the case where two of the factors would suggest considering the associated stroke user input, and the third factor suggests not considering the associated stroke user input in deciphering the entered character, then the majority option is taken and the associated stroke user input would be considered in deciphering the entered character.

In other examples, the consideration may include determining if one or more further stroke user inputs are entered partially or wholly in the same region as the one or more associated stroke user inputs, and if so, considering the one or more associated stroke user inputs in deciphering the entered character. In other examples, the consideration may include determining if the one or more associated stroke user inputs cross one or more previously entered stroke user inputs more than a predetermined number of times, and/or determining if the one or more associated stroke user inputs provide a change in applied pressure exceeding a predetermined pressure range when input on a touch-sensitive screen of the apparatus, and/or; and if so determined, removing from consideration the one or more associated stroke user inputs in deciphering the entered character. In other examples, the number of factors considered may be only one, two, four, five or more.

Different consideration factors may be given different weightings. For example, whether or not the associated stroke user input touches the edge of the stroke user input region may be considered, along with other considerations. The consideration of the associated stroke user input reaching the edge of the stroke user input region or not in this example has the greatest weighting. Thus, if the other considerations indicate that the associated stroke user input should be considered in deciphering an entered character, but the apparatus determines that the associated stroke user input has reached the edge of the stroke user input region, then that associated stroke user input would not be considered in deciphering the entered character regardless of the other considerations due to the importance/weighting of the consideration of the stroke touching the edge of the stroke user input region.

In this example in FIGS. 4a-4f, the associated stroke user input is considered in deciphering the entered character against three predetermined criteria.

It may be in other examples that the apparatus considers the associated stroke user input in the context of it having been entered during a detected jolt. The consideration may be to give less 'weight' (less importance) to an associated stroke user input than to another stroke user input made while no jolt is detected, but the apparatus may still consider the associated stroke user input in deciphering the entered character. In other examples, the apparatus may consider, for example, two partially overlapping strokes, where the first associated stroke user input was made during a jolt and the second stroke user input was correctly made to overwrite the first erroneous stroke. Consideration of the associated stroke user input in this case may include considering the overlapped portion of the associated stroke user input as this portion may be considered to not be the erroneously entered portion (e.g. the portion may have been entered before the jolt was detected.) In other examples, the associated stroke user inputs may be considered for removal from consideration in deciphering the entered character, but upon some other indication (such as the user continuing to scribe during the timeout period, for example) decide not to remove them from consideration. For example, if a user continues to scribe during the timeout period this continued input may be detected and interpreted by the apparatus that the associated stroke user inputs are acceptable to the user (as they have chosen to carry on scribing).

Figure 4D:
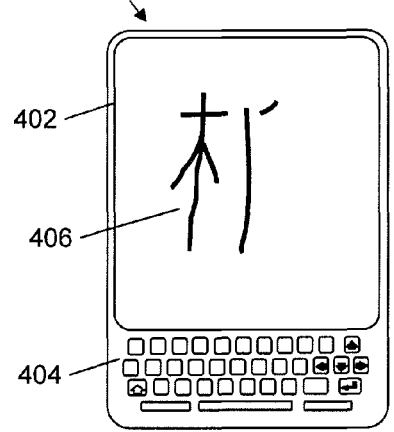

FIG. 4d shows that the predetermined timeout period has ended and that the associated stroke user input has been removed from display after the timeout period. This may be done to allow the user to continue to enter the strokes forming the entered character without being distracted by the displayed erroneous stroke. In other examples, the associated stroke user input may be removed from display during the predetermined timeout period rather than after the timeout period. Also in other examples (as shown in FIG. 5), the apparatus/device may be configured to enable detection of one or more further stroke user inputs during the predetermined timeout period, to allow input of a character to be completed. This may be done with or without including (displaying and/or considering for deciphering of the character) the one or more associated stroke user inputs. It can be seen that the associated stroke user input(s) only is required to be re-entered, rather than the user being required to re-enter the whole character again from the beginning. Re-entering the whole character from the start would waste time for the user if the strokes entered up until the entry of the bad stroke are acceptable as in this example shown in FIG. 4d.

Figure 4E:
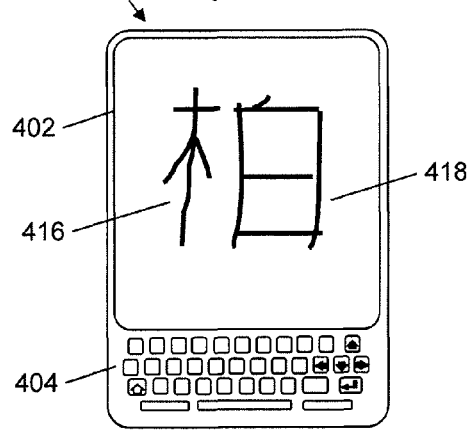

FIG. 4e shows that the user has entered further stroke user inputs 418 alongside the previous stroke user inputs not entered during a jolt 416 in order to complete the character. The apparatus/device 400 is configured to enable detection of one or more further stroke user inputs 418 after the predetermined timeout period, to allow input of a character to be completed. This may be with or without the one or more associated stroke user inputs. In this example, since one or more further stroke user inputs have been detected after the predetermined timeout period, the one or more associated stroke user inputs are at least one of displayed and considered in deciphering the entered character. In this example, the associated stroke user input 412 is considered in the deciphering of the entered character as described above (and in fact after consideration, is not used in deciphering the entered character), although it is no longer displayed after the timeout period.

In other examples, the associated stroke user input(s) may not be considered in the deciphering of the entered character nor displayed. That is, the apparatus may be configured to enable detection of one or more further stroke user inputs after the predetermined timeout period to allow input of a character to be completed, without the one or more associated stroke user inputs.

Figure 4F:
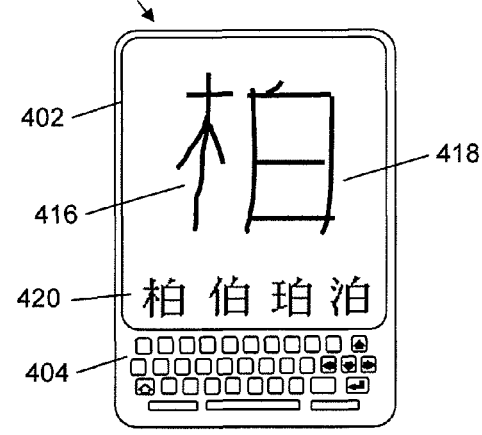

FIG. 4*f* shows that the apparatus 400 has detected that the character entry is complete, and offers a list of predefined characters 420 for selection which have been determined by the apparatus to match the user-entered character 416, 418.

In this example, one character has been entered. In other examples (such as shown in FIGS. 8 and 9), the entered character may comprise a series of two or more subcharacters. Also in this example, the apparatus is configured to decipher a Chinese character, which may be considered to be a (Chinese) textual character, a graphic character, or a glyph.

The apparatus/device 400 in this example is configured to recognise characteristics of the user's handwriting. For example, the user tends to scribe their vertical lines as off-vertical, and leaning to the right a little. The apparatus/device 400 is configured to eliminate associated stroke user inputs 412 made during a jolt from consideration in deciphering the entered character. In this way, if the user is jolted and scribes a vertical line as a diagonal stroke leaning to the left, this stroke would not be considered by the apparatus as a usual handwriting stroke. By elimination such "non-standard" erroneous strokes, the accuracy of the handwriting recognition capability of the apparatus/device is not reduced by the inclusion of strokes (such as strokes made during a jolt) which do not reflect characteristics of the users handwriting.

Figure 5A:
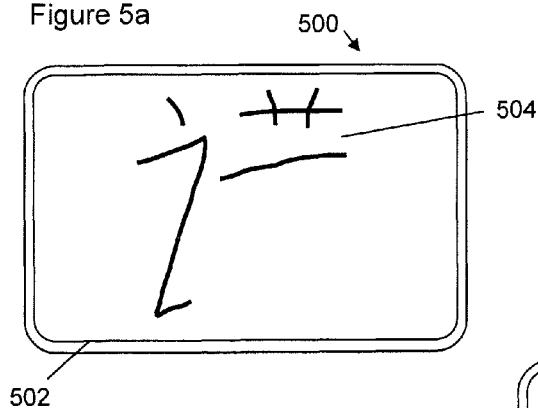
FIGS. 5a-5d illustrate an example of a device/apparatus being jolted while a user is entering a character, where the user continues to enter the character during a timeout period.

FIGS. 5*a*-5*d* illustrate an example embodiment of an apparatus in use. The apparatus is a portable electronic device 500 such as a tablet computer, smartphone, PDA or graphics tablet. The device 500 has a touch-sensitive screen 502. The device 500 is operating in a character entry mode, and is running an application which allows a user to enter characters via scribing (using, for example, a finger or a stylus) on the touch-sensitive screen. The user can enter one or more stroke inputs on the touch-sensitive screen 502 to build up the completed character. In FIG. 5*a*, the user has partially entered a Chinese character by inputting six strokes 504.

Figure 5B:
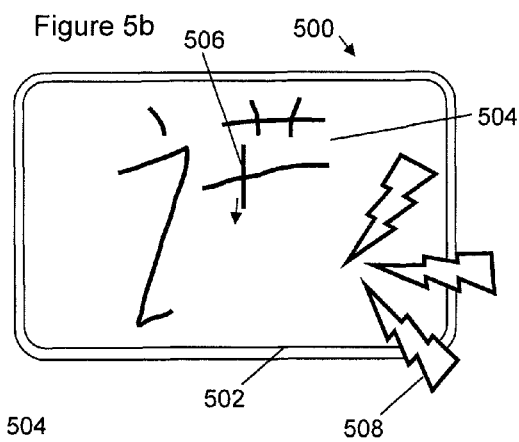
Figure 5C:
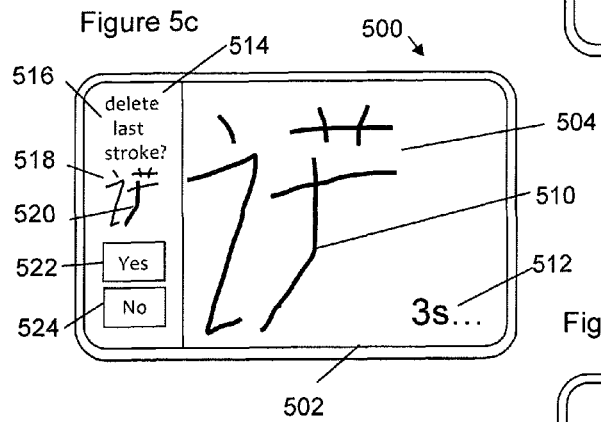

In FIG. 5*b*, the apparatus/device 500 has been jolted 508 during the character entry mode (for example, by another person knocking the device 500 while the user was entering a stroke user input 506). Upon detection of the jolt, the apparatus 500 associates the stroke user inputs 506 with the jolt. A predetermined timeout period is provided 512, 530 as shown in FIG. 5*c*, during which the associated stroke user input 510 is at least one of considered for removal from display and considered for removal from consideration in deciphering the entered character. In this example, it is considered for removal from display, but after consideration, remains displayed. The consideration in this example includes determining whether or not the associated stroke user input 510 touches the outer boundary of the stroke user input area 502, consideration of the number of direction changes of the associated stroke user input 510 against a predetermined number of direction changes (in this example, the predetermined number of direction changed is five), and consideration of the number of times the associated stroke user input crosses other stroke user inputs compared with a predetermined number of crossings (the predetermined number of crossings in this example is two). Other predetermined criteria may be envisaged and may be different depending on, for example, the language which the user is writing in.

Further, the associated stroke user input 510 is considered for removal from consideration in deciphering the entered character but in this example is still considered, and therefore is not removed from consideration, in deciphering the entered character. The consideration in this example includes determining if the associated stroke user input contributes to an entered character which can be deciphered. The apparatus compares the associated stroke user input with a database of standard Chinese character stroke forms and determines that the associated stroke user input can be understood to have a standard Chinese character stroke form. The consideration in this example also includes if the pressure applied to the touch-sensitive display 502 by the scribing stylus during input of the associated stroke user input 510 does not exceed a predetermined pressure range; it has been determined that the pressure range was not exceed in this example. In other examples the criterion may be that a particular maximum and/or minimum pressure boundary was crossed during input of the associated stroke user input instead of (or as well as) considering the range of pressures detected during input of the associated stroke user input.

FIG. 5*c* shows that the timeout period has started following the detected jolt 508 and is indicated by a countdown clock 512. In this example, during the timeout period, the apparatus is configured to present an option for selection by the user during the predetermined timeout period. The presented options are shown in the pop-up area 514. The user is asked a question 516 if they wish to manually delete the stroke user input(s) detected to have been entered during the jolt 508. The user can manually select yes 522 to delete the stroke(s) or no 524 to keep the stroke(s). The pop-up area 514 in this example also includes an indicator for the user to see exactly which stroke(s) will be deleted upon the user selecting the "yes" option 522 (which stroke(s) will be kept if the user selects the "no" option 524). The indicator 518 in this example shows the strokes to be deleted/kept as bold strokes 520 compared with the strokes in the character which are not being considered for deletion.

In this example the user is asked if they wish to "delete last stroke?" 516. This means the user can select an option to remove the associated stroke user input(s) from display. The apparatus in this example will still consider the associated stroke user input(s) when deciphering the entered character, although the user need not be concerned with this as the user does not necessarily need to know how the apparatus performs the deciphering.

In other examples, the user may be presented with two options (possibly at the same time or possibly one after the other). The first option may be, as in the previous example, of whether the user wishes to delete/remove the associated stroke user input(s) from display or not. The second option may be whether the user wishes to remove the associated stroke user input(s) from consideration in the deciphering of the entered character.

In other examples, the apparatus/device 500 may be configured to perform the removal from display of the associated stroke user input(s) without the user providing any specific confirmation or selection of a related option. In other examples, the device 500 may be configured to perform the removal from consideration of the associated stroke user input(s) in deciphering the entered character, without explicit user confirmation (by for example selecting a displayed "yes/no" option). In some examples, the apparatus may be configured to perform both these actions (removal from display and removal from consideration in deciphering the entered character) without explicit user instruction/confirmation.

Figure 5D:
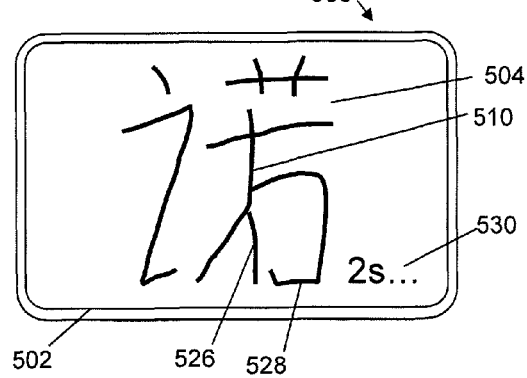

FIG. 5*d* shows that the user has selected the "no" option 524 and has continued to enter further stroke user inputs 526, 528 during the timeout period (indicated by the countdown clock 530). The apparatus/device 500 is configured to enable detection of these further stroke user inputs 526, 528 during the predetermined timeout period (indicated by the clock 530) to allow input of a character [504, 526, 528] to be completed with the one or more associated stroke user inputs 510 (that is, with the associated stroke user inputs being displayed and/or considered in deciphering the entered character). The user may alternatively in this example have ignored the pop-up area 514 shown in FIG. 5*c* and continued to enter stroke user inputs 526, 528. In this case, the pop-up area 514 may be removed from display upon the user continuing to enter stroke user inputs 526, 528. In other examples the pop-up area 514 may remain displayed for the duration of the timeout period.

In other examples, the apparatus/device 500 may be configured to enable detection of one or more further stroke user inputs 526, 528 during the predetermined timeout period to allow input of a character [504, 526, 528] to be completed without the one or more associated stroke user inputs 510 (that is, without the associated stroke user inputs being displayed or being considered in deciphering the entered character if further stroke user inputs are detected).

The apparatus 500 is able to decipher the entered character. The deciphering may be comparison of the entered strokes forming a completed character with a database of known characters so that the user is able to choose a character from a list of characters determined by the apparatus to match the user-entered character.

In the example of FIGS. 5*a*-5*d*, the user has completed entering the character during the timeout period (as indicated by the countdown clock 530 displayed after the entry of the final stroke 528 of the character has been made). Had the user not completed the input of all the strokes of the character by the end of the timeout period, the user may continue to enter one or more further stroke user inputs after the predetermined timeout period, to allow the input of the character to be completed. This may be with or without the one or more associated stroke user inputs 510 associated with a detected jolt.

FIGS. 6*a*-6*f* illustrate an example embodiment of an apparatus 600 in use. The apparatus is a portable electronic device 600 such as a tablet computer, smartphone, PDA or graphics tablet. The device 600 has a touch-sensitive screen 602 and a western virtual keyboard. The apparatus/device 600 is operating in a character entry mode and is allowing a user to enter characters via scribing strokes 608, 610, 612, 626, 622 on the touch-sensitive screen. In this example, the user is entering a Chinese character, but the apparatus/device may be configured to allow the input and subsequent deciphering of, for example, Japanese or Korean characters, Arabic, Urdu, Hindi or Bengali script, or mathematical symbols, for example. The user in this example is able to scribe using a stylus 606 and in FIG. 6*a*, has entered two strokes 608, 610 of a character. The apparatus 600 is configured to be able to decipher characters entered on screen 602, by comparison of the scribed character with a database of known characters.

In FIG. 4*b*, the user was part-way through entering a third stroke user input 612 to continue with entry of the desired character, but the user's writing arm was jolted 614, and therefore the writing stylus 606 used to enter stroke user inputs to the device 600 was jolted 614.

In FIG. 6*c*, it can be sent that the user's third stroke user input 616 was not entered correctly due to the jolt 614. The apparatus/device 600 is configured to enable detection of the jolt 614 via an accelerometer located in the stylus 606. In other examples (such as in FIGS. 4 and 5) an accelerometer may be located with the body of the device 600. In other examples, both the body of the device 600 and the stylus 606 may contain accelerometers able to detect jolts. The apparatus/device 600 detects the jolt 614, and associates the stroke user input being entered 612, 616 at the time of the jolt 614 with the jolt 614. In this way the apparatus 600 can determine that the stroke 616 may not be correct.

The apparatus 600 provides for a predetermined timeout period as indicated by the timeout bar 618, 620. During this timeout period, the apparatus considers the removal from display of the associated stroke user input 616. The apparatus 600 determines, during the timeout period, and according to one or more predetermined criteria, whether or not to remove the associated stroke user input from display. In this example, the apparatus 600 also considers, during the timeout period, the removal from consideration of the associated stroke user input in deciphering the entered character. Again this determination may be according to one or more predetermined criteria.

Such predetermined criteria as to whether to remove an associated stroke user input from display and/or remove from consideration in deciphering the entered character include, for example, if the associated stroke user input touches the outer boundary of the writing area on the touch-sensitive screen (such as the associated stroke user input 412 in FIG. 4*c*). If a user is jolted and their stylus/finger is jolted to slide off the side of the writing area (which may be the whole touch-sensitive screen, or a significant portion of it), then this can serve as an indication that the associated stroke user input is unlikely to be close to the stroke intended and should therefore be removed from display and/or consideration in deciphering the entered character.

Another predetermined criterion may be the number of abrupt direction changes of one particular stroke. If a stroke abruptly changes direction more than a particular predetermined number of times this may be an indicator that the entered stroke does not accurately reflect the intended stroke. The number of abrupt changes of direction allowable before the apparatus considers that the stroke may not reflect the intended stroke may be set dependent on the nature or type of the character being entered. For example, a stroke input during the entry of a Chinese character may be unlikely to abruptly change direction more than, for example, six times. In another writing system, for example, Japanese, a stroke input during character entry may be unlikely to abruptly change direction more than, for example, twice.

Another predetermined criterion may be if the associated stroke user input crosses previously input strokes of the same character more than a particular number of times. It may be that it is unlikely for strokes to cross over each other more than a certain number of times if the stroke user inputs are entered as intended. An associated stroke user input may erroneously cross over previously scribed strokes due to a jolt occurring.

Another predetermined criterion may be if the apparatus is configured to detect changes in pressure applied to the writing surface (graphics pad, touch sensitive screen or other writing surface). If an abrupt change in pressure is detected during the input of an associated stroke user input, then this may serve as an indication to the apparatus that the stroke is not as intended.

The predetermined criteria for the removal of an associated stroke user input from display may be different, or may be the same, as the predetermined criteria for the removal from consideration of an associated stroke user input in deciphering an entered character.

The apparatus/device 600 is configured to enable detection of one or more further stroke user inputs during the predetermined timeout period to allow input of a character to be completed with or without the one or more associated stroke user inputs, although in this example, the user has chosen to wait until the end of the timeout period before continuing to enter stroke user inputs.

The apparatus/device 600 is also configured to remove the associated stroke user input(s) 616 from display, but still consider the associated stroke user input(s) 616 in deciphering the entered character. FIG. 6e shows that the associated stroke user input has been removed from display, leaving the first two strokes 608, 610 entered before the jolt 614 occurred. The removal from display of the associated stroke user input 616 occurs without user confirmation. In other examples the stroke 616 may remain displayed.

The apparatus/device 600 is also configured to enable detection of one or more further stroke user inputs 622 after the predetermined timeout period to allow input of a character to be completed. This is shown in FIG. 6f where the user has continued, after the timeout period, to input stroke user inputs in order to complete the character.

FIGS. 7a-7b illustrate an apparatus 700 which enables detection via input (e.g. via a user's finger) onto the touch-sensitive screen 702 of one or more stroke user inputs for use in deciphering an entered character 704 during a character entry mode. The apparatus/device 700 is configured such that upon completion of character entry as shown in FIG. 7b, the apparatus 700 provides one or more (in this case, four) predefined deciphered characters 706, 708, 710, 712 for selection by the user. The predefined deciphered characters 706, 708, 710, 712 have been determined by the apparatus 700 to match the entered character 704. It can be seen that in this case, the first predefined deciphered character 706 matches the entered character 704.

Figure 8A:
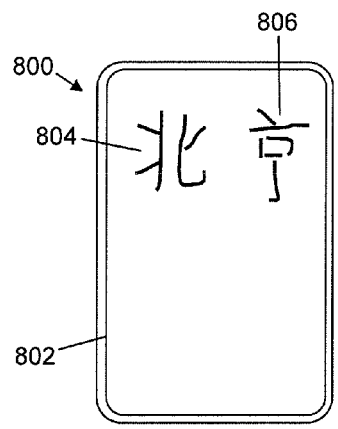
FIGS. 8a-8c illustrate an example of a device/apparatus providing predefined characters each comprising more than one sub-character determined to be a possible match for a user-entered character.
Figure 8B:
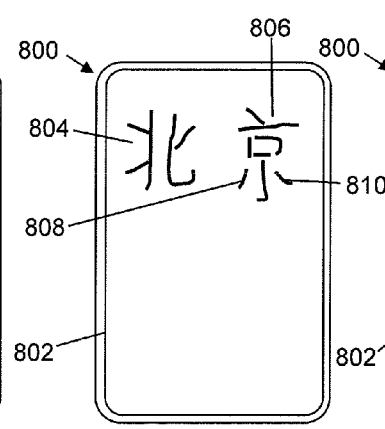

FIGS. 8a-8b illustrate an apparatus 800 which enables detection via input onto the touch-sensitive screen 802 of one or more stroke user inputs for use in deciphering an entered character 804, 806 during a character entry mode. In this example, the character 804, 806 actually comprises two individual "sub-characters". In this example each character 804, 806 may be considered a sub-character in that, while each individual sub-character 804, 806 alone has a sensible meaning, the two sub-characters together 804, 806 form a new word (or common phrase). In this example, sub-character 804 means "north" and sub-character 806 means "capital", but together the two sub-characters 804, 806 are taken together to mean "Beijing", the capital city of China.

Figure 8C:
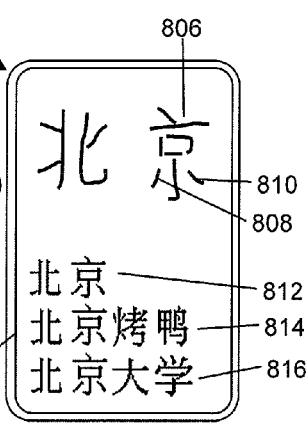

FIG. 8a shows that the user has entered the first sub-character 802 and is in the process of writing the second sub-character 806. In FIG. 8b the user has completed the second sub-character 806 by entering the stroke user inputs 808 and 810. In FIG. 8c, the user is presented with a series of predefined options 812, 814, 816 which the apparatus has determined provide a match 812, 814, 816 for the entered characters 804, 806. The apparatus may be able to perform "predictive text" operations and after the entry of one or more (sub-)characters, the apparatus may present a list of possible match options to the user for selection.

Figure 9A:
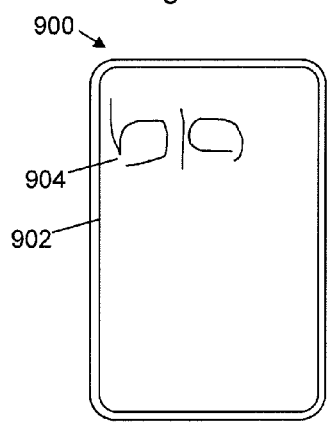
FIGS. 9a-9c illustrate an example of a device/apparatus providing predefined characters (words) each comprising more than one sub-character (letter) determined to be a possible match for a user-entered character (word)
Figure 9B:
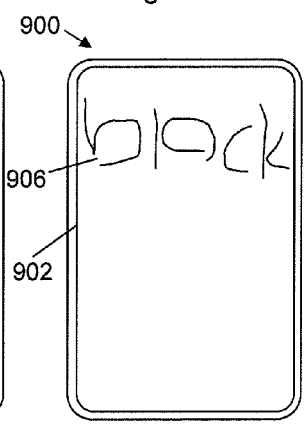
Figure 9C:
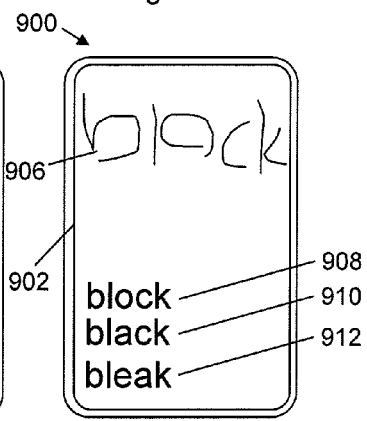

FIGS. 9a-9c illustrate an apparatus 900 which enables detection via input onto the touch-sensitive screen 902 of one or more stroke user inputs for use in deciphering an entered character 906 during a character entry mode. In this example the character entry mode is configured to detect western alphanumeric characters/letters.

FIG. 9a shows that the user has entered the sub-characters (letters) "bla" 904. In FIG. 9b the user has completed the "character" (word) 906 by entering the stroke user inputs "c" and "k" to complete the "character" (word) 906, which is the word "black". In FIG. 9c, the user is presented with a series of predefined options: "black" 908; "block" 910 and "bleak" 912, which the user can select one of. The user may, in other examples, also have an option to choose "none of these" and further deciphering of the entered strokes/characters may take place. It will be appreciated that each of the letters "b", "l", "a", etc. could also be considered characters in other example embodiments.

In the examples of FIGS. 7-9, the apparatus is configured to enable detection of one or more stroke user inputs for use in deciphering an entered character during a character entry mode, and although not explicitly shown in FIGS. 7-9, the skilled person would appreciate from the examples in FIGS. 4-6, that the apparatus 700, 800, 900 are also configured to enable detection of a jolt during the character entry mode; upon detection of the jolt, associate one or more of the stroke user inputs with the jolt; and provide for a predetermined timeout period during which the one or more associated stroke user inputs are at least one of considered for removal from display and considered for removal from consideration in deciphering the entered character.

Figure 10:
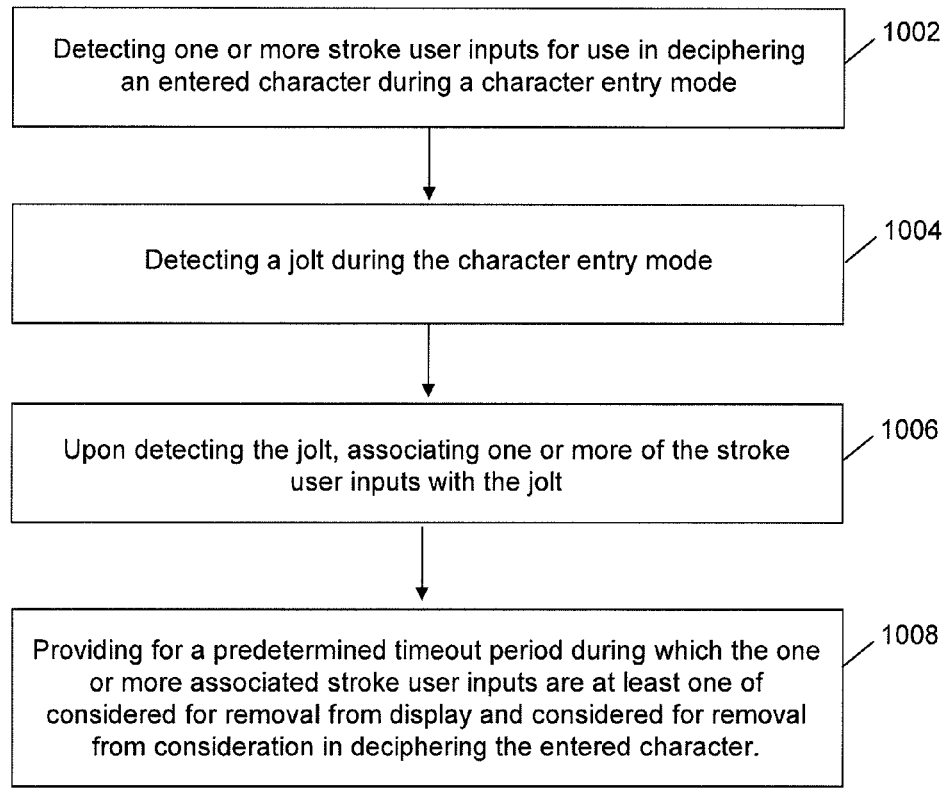
FIG. 10 illustrates an example method according to the present disclosure.

FIG. 10 shows a flow diagram illustrating a method of enabling detection of one or more stroke user inputs for use in deciphering an entered character during a character entry mode 1002; enabling detection of a jolt during the character entry mode 1004; upon detection of the jolt, associating one or more of the stroke user inputs with the jolt 1006; and providing for a predetermined timeout period during which the one or more associated stroke user inputs are at least one of considered for removal from display and considered for removal from consideration in deciphering the entered character 1008, and is self-explanatory.

Figure 11:
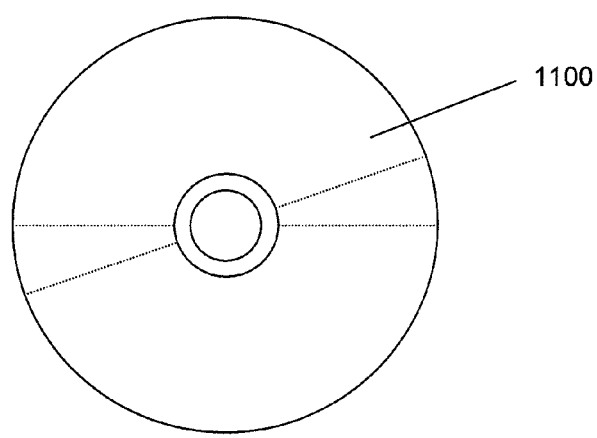
FIG. 11 illustrates schematically a computer readable medium providing a program.

FIG. 11 illustrates schematically an embodiment comprising a computer/processor readable medium 1100 providing a computer program. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the disclosure as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:
   at least one processor; and
   at least one memory including computer program code,
   the at least one memory and the computer program code configured to, with the at least one processor, cause the apparatus to perform at least the following:
   upon detection of a jolt during stroke user input scribing a character in a character entry mode, the character entry mode enabling detection of one or more stroke user inputs for use in deciphering an entered character,
   associate one or more of the stroke user inputs scribing the character with the jolt; and
   provide for a predetermined timeout period at least one of during and after which the one or more associated stroke user inputs are at least one of
   removed from display and
   removed from consideration in deciphering the entered character.

2. The apparatus of claim 1, wherein the apparatus is configured to enable detection of one or more further stroke user inputs during the predetermined timeout period to allow input of the character to be completed with the one or more associated stroke user inputs, and if one or more further stroke user inputs are detected during the predetermined timeout period, the one or more associated stroke user inputs are at least one of displayed and considered in deciphering the entered character.

3. The apparatus of claim 1, wherein the apparatus is configured to enable detection of one or more further stroke user inputs during the predetermined timeout period to allow input of the character to be completed, and if one or more further stroke user inputs are detected during the predetermined timeout period, the one or more associated stroke user inputs are at least one of removed from display and removed from consideration in deciphering the entered character.

4. The apparatus of claim 1, wherein the apparatus is configured to remove the one or more associated stroke user inputs from display but still consider the one or more associated stroke user inputs in deciphering the entered character according to a predetermined criterion.

5. The apparatus of claim 4, wherein the predetermined criterion for still considering the one or more associated stroke user inputs in deciphering the entered character includes at least one of:
   determining that one or more further stroke user inputs entered during the predetermined timeout period are entered partially or wholly in the same region as the one or more associated stroke user inputs; and
   determining that the associated stroke user inputs contribute to an entered character which can be deciphered.

6. The apparatus of claim 1, wherein the apparatus is configured to remove from consideration the one or more associated stroke user inputs in deciphering the entered character according to a predetermined criterion which includes at least one of:
- determining that the one or more associated stroke user inputs touch the edge of a predefined stroke user input region;
- determining that the one or more associated stroke user inputs include more than a predetermined number of direction changes;
- determining that the one or more associated stroke user inputs cross one or more previously entered stroke user inputs more than a predetermined number of times; and
- determining that the one or more associated stroke user inputs provide a change in applied pressure exceeding a predetermined pressure range during the character entry.

7. The apparatus of claim 1, wherein the apparatus is configured to enable detection of one or more further stroke user inputs after the predetermined timeout period to allow input of the character to be completed, with the one or more associated stroke user inputs, and if one or more further stroke user inputs are detected after the predetermined timeout period, the one or more associated stroke user inputs are at least one of displayed and considered in deciphering the entered character.

8. The apparatus of claim 1, wherein the apparatus is configured to enable detection of one or more further stroke user inputs after the predetermined timeout period to allow input of the character to be completed, and if one or more further stroke user inputs are detected after the predetermined timeout period, the one or more associated stroke user inputs are at least one of removed from display and removed from consideration in deciphering the entered character.

9. The apparatus of claim 1, wherein the apparatus is configured such that no further stroke user inputs are detected during the predetermined timeout period for use in deciphering the entered character.

10. The apparatus of claim 1, wherein the apparatus is configured to indicate to the user the one or more associated stroke user inputs, to allow the user to at least one of:
- remove from display; and
- remove from consideration in deciphering the entered character, the one or more associated stroke user inputs.

11. The apparatus of claim 10, wherein the apparatus is configured to present an option for selection by the user during the predetermined timeout period, the selection of the option allowing the user one or more of:
- removal from display; and
- removal from consideration in deciphering the entered character, of the one or more associated stroke user inputs.

12. The apparatus of claim 1, wherein the apparatus is configured such that upon completion of character entry, the apparatus provides one or more predefined deciphered characters for selection, the predefined deciphered characters determined by the apparatus to match the entered character.

13. The apparatus of claim 1, wherein the entered character comprises a series of two or more sub-characters.

14. The apparatus of claim 1, wherein the apparatus is configured to decipher at least one of, a letter character, a textual character, a number, a graphic character, an emoticon, a glyph, and a punctuation mark.

15. The apparatus of claim 1, wherein the apparatus is configured to enable detection of one or more stroke user inputs entered by a user on a touch-sensitive display.

16. The apparatus of claim 1, wherein the apparatus is configured to enable detection of the jolt via one or more of an accelerometer of the apparatus and an accelerometer located with a stylus for entering stroke user inputs to the apparatus.

17. The apparatus of claim 1, wherein the apparatus is configured to recognise characteristics of the user's handwriting by eliminating associated stroke user inputs from consideration in deciphering the entered character.

18. The apparatus of claim 1, wherein the apparatus is configured to perform one or more of removal from display or removal from consideration in deciphering an entered character of one or more associated stroke user inputs without user confirmation.

19. A computer-implemented method, the method comprising:
- upon detecting a jolt during stroke user input scribing a character in a character entry mode, the character entry mode enabling detection of one or more stroke user inputs for use in deciphering an entered character,
- associating, by a processor, one or more of the stroke user inputs scribing the character with the jolt; and
- providing, by a processor, for a predetermined timeout period at least one of during and after which the one or more associated stroke user inputs are at least one of
  removed from display and
  removed from consideration in deciphering the entered character.

20. A computer readable medium comprising computer program code stored thereon, the computer readable medium and computer program code being configured to, when run on at least one processor, perform at least the following:
- upon detection of a jolt during stroke user input scribing a character in a character entry mode, the character entry mode enabling detection of one or more stroke user inputs for use in deciphering an entered character,
- associate one or more of the stroke user inputs scribing the character with the jolt; and
- provide for a predetermined timeout period at least one of during and after which the one or more associated stroke user inputs are at least one of
  removed from display and
  removed from consideration in deciphering the entered character.

* * * * *